May 22, 1934.  H. M. STOLLER  1,959,449
SYNCHRONOUS MOTOR
Filed Sept. 17, 1931

INVENTOR
H. M. STOLLER
BY
Guy T. Morris
ATTORNEY

Patented May 22, 1934

1,959,449

UNITED STATES PATENT OFFICE 1,959,449

SYNCHRONOUS MOTOR

Hugh M. Stoller, Mountain Lakes, N. J., assignor to Bell Telephone Laboratories, Incorporated, New York, N. Y., a corporation of New York Application September 17, 1931, Serial No. 563,281

4 Claims. (Cl. 172—280)

This invention relates to synchronous motors, and in particular to a synchronous motor which will operate on the output of a vacuum tube, which will be reversible, which will be self-starting at any frequency up to about 60 cycles per second, and in which may be incorporated a rotor of small size and small moment of inertia in order to reduce bearing friction and enable the rotor quickly to accelerate from rest to full synchronous speed without the aid of damping windings.

The object of the invention is to provide a motor which will give most satisfactory service in the performance of the above functions, and which is adapted for use as a synchronizing means generally and especially in a particular common frequency broadcasting system.

In the following description the terms "cycles" and "kilocycles" are employed instead of the expressions "cycles per second" and "kilocycles per second", respectively, to designate frequencies.

In the common frequency broadcasting system in question a standard frequency current of 4,000 cycles is generated at a central station and transmitted over wire lines to each station to be controlled. At each station the standard frequency current is multiplied to 10 kilocycles less than the common carrier frequency. That is, if the common carrier frequency waves of the transmitters is 500 kilocycles, the incoming standard current is multiplied in frequency to 490 kilocycles. At the local station a crystal controlled oscillator generates a wave of the carrier frequency of the station and the output is used to control the carrier frequency. Small adjustments in this frequency may be made by changing a variable condenser connected in parallel with the crystal. This frequency, in the case cited, will be 500 kilocycles plus or minus small deviations. These deviations will never exceed 30 cycles except in cases of a breakdown of the station, and ordinarily will be considerably less. A component of the locally generated carrier wave of approximately 500 kilocycles is beat with the wave of 490 kilocycles to produce a wave of 10 kilocycles plus or minus the small deviations in the locally generated wave. This wave is fed into a split-phase double balanced modulator to be referred to later. In one step of the multiplication of the 4,000 cycle current to 490 kilocycles a wave of 10 kilocycles is produced. A component of this wave of 10 kilocycles is also fed into one pair of the tubes comprising the split-phase double balanced modulator. Another component of this wave of 10 kilocycles is passed through a phase shifting device and is supplied to the other pair of balanced modulator tubes in 90° phase displacement from the first. The output of each of the four modulator tubes is applied to a stator pole of the synchronous motor to be described hereinafter. The shaft of the rotor of this motor is geared to means for varying the condenser connected across the crystal, which control the carrier frequency of the station. If the locally generated carrier frequency is too high by two cycles, for example, the output of the detector in which the 490 kilocycle wave is beat with the locally generated carrier wave will be 10,002 cycles; this wave is fed into the double balanced modulator where it is modulated with the 10 kilocycle wave previously referred to. The output which is applied to the stator of the synchronous motor is a wave which sets up a field rotating at 2 cycles per second in a direction to turn the rotor so as to change the capacity of the condenser across the crystal in such a direction as to decrease the carrier frequency. The motor will turn more slowly as the frequency decreases until the frequency of the locally generated carrier is exactly 500 kilocycles. If the locally generated carrier frequency is too low by two cycles, for example, the output of the detector in which the 490 kilocycle wave is beat with the locally generated carrier wave will be 9,998 cycles. This wave will produce in the output of the double balanced modulator a wave of 2 cycles and will set up a field in the stator of the synchronous motor which is rotating at 2 cycles per second in a direction to turn the rotor so as to change the capacity of the condenser across the crystal in a direction opposite to the change above considered and so as to increase the carrier frequency. The split-phase double balanced modulator is disclosed and claimed in United States Patent 1,762,725, issued June 10, 1930 to W. A. Marrison.

A feature of the motor of the invention is an arrangement of teeth on the stator and rotor so that the rotor receives a torque impulse moving the rotor one-quarter of a tooth pitch each time a magnetizing pulse of current is applied to the stator.

Another feature of the motor is the combination with the tooth arrangement of means for providing a return magnetic circuit of substantially constant reluctance for the flux from the phases which are active at any instant by way of the inactive phases at that instant.

Another feature of the motor is the provision of a common return at the base of the yoke for the stator magnetic circuit. In the system described above, as the frequency of the locally generated carrier wave approaches 500 kilocycles in the example given, the wave in the output of the double balanced modulator approaches zero frequency. It is therefore impossible to use transformers if the locally generated carrier wave is to be controlled precisely at its intended frequency. This requires a motor that will operate on the superposed D. C. current in the output of the vacuum tubes.

In the preferred embodiment of the invention, the motor has four pole pieces hereafter referred to as poles or pole pieces, each encircled by a winding in the plate circuit of one of the modulator tubes. The poles each have two polar projections, and the projections on successive poles align with the rotor teeth with movements of the rotor equal to a quarter of a tooth pitch. The poles are so wound that successive poles are oppositely polarized, and the poles are connected at their bases so that they have a common magnetic circuit for the return of the flux.

On account of the low frequency range at which the motor usually operates, the use of solid pole pieces and a solid rotor is preferred, although these may be laminated, if desired.

Figure 1:
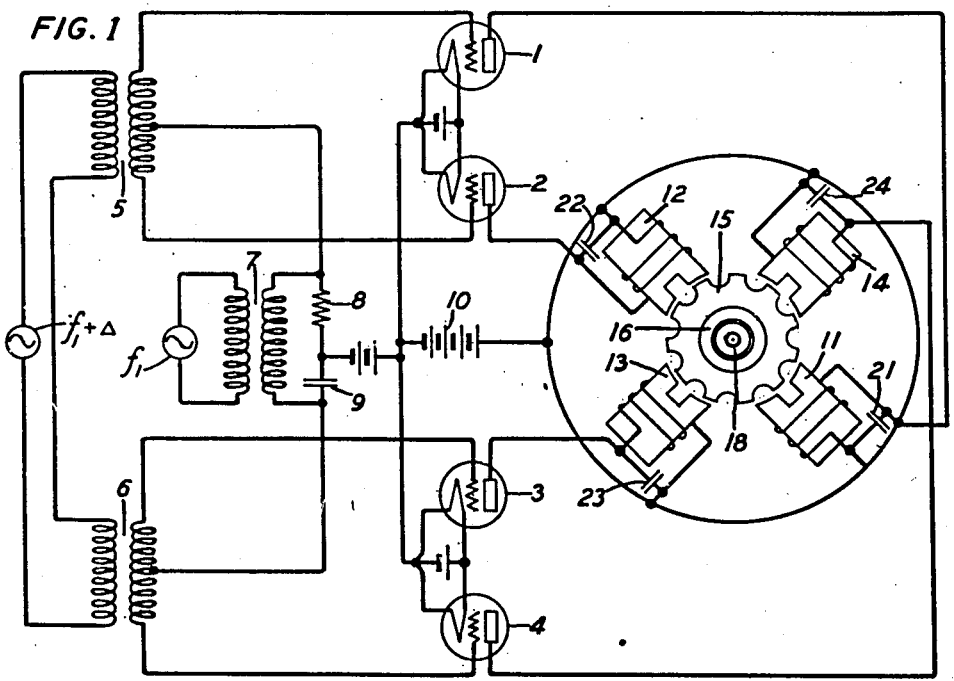
Fig. 1 is a schematic diagram of the split-phase double balanced modulator with the motor of the invention connected in the output circuit.

In Fig. 1 two sources of oscillations are indicated as $f_1$ and $f_1+\Delta$. To continue the example already given $f_1$ may be taken to represent the wave of 10,000 cycles derived from the incoming standard frequency wave of 4,000 cycles, while $f_1+\Delta$ may be taken to represent the output of the modulator in which the wave of 490 kilocycles derived from the incoming standard frequency wave is modulated with the locally generated carrier wave of approximately 500 kilocycles. Vacuum tubes 1 and 2 with their associated circuits constitute a balanced modulator and vacuum tubes 3 and 4 with their associated circuits constitute a second balanced modulator. Frequency $f_1+\Delta$ is applied to the input circuits of the two tubes of each of the two modulators differentially by means of transformers 5 and 6, while frequency $f_1$ is applied to the input circuits of the two tubes of each of the two modulators in parallel by means of transformer 7. Resistance 8 and condenser 9 serve to split the phase of the wave of frequency $f_1$, so that the wave applied to modulator 1, 2 from this source is in quadrature with the wave applied to modulator 3, 4 from this source.

The plate circuit of the double balanced modulator may be traced as follows:

From the filament through the common plate battery 10 to the point joining the four plate circuits, the circuits are common. From this point the winding around the pole 11 goes to the plate of tube 1; the winding around the pole 12 goes to the plate of tube 2; the winding around pole 13 goes to the plate of tube 3; and the winding around pole 14 goes to the plate of tube 4. Across the windings around the poles, condensers 21, 22, 23 and 24, respectively, are connected. These condensers by-pass the high frequency components of the tube plate currents but are sufficiently small so as to have negligible effect on the low frequency motor current.

In the case of one motor which was tested, it jumped into synchronism on any frequency from 0 to 20 cycles on one milliampere of A. C. current, from 20 to 40 cycles on two milliamperes, and from 40 to 60 cycles on eight milliamperes. Its ability to so perform is a desirable characteristic for the following reasons:

It will be noted that in the system described the carrier frequency of each station is controlled by the local oscillator. In the event of line failure of the four thousand cycle current, the station will continue operating. If the line is broken for several hours the local oscillation generator may shift from its frequency as much as 30 cycles so that when it is again effective the motor will suddenly be supplied with current of 30 cycles. It is to be noted also that the frequency control is positive, that is, the motor will immediately go to work and restore the locally generated carrier wave to its correct frequency regardless of prolonged interruptions in the standard frequency wave.

The currents in the windings around the poles 11 and 12 in the plate circuit of the modulator 1, 2 will be 180° out of phase with each other. Likewise, the currents in the windings around the poles 13, 14 in the plate circuit of modulator 3, 4 will be 180° out of phase with each other. But due to the difference in phase of the frequency $f_1$ applied to the two modulators, the points of maximum and minimum current in the plate circuit of modulator 1, 2 will be displaced 90° with respect to the points of maximum and minimum in the plate circuit of modulator 3, 4. The plate current in all cases will of course be undulating direct current. If the plate current is regulated so that it varies from a maximum to zero, the effect on the stator poles will be as follows:

At one instant maximum current will flow in the winding around pole 12; at this instant the current around pole 11 will be zero; while the current around poles 13 and 14 will be fifty per cent of maximum. 90° later the current around pole 13 will be a maximum, if $f_1+\Delta$ is higher than $f_1$, say, the current around pole 14 will be zero, while the current around poles 11 and 12 will be fifty per cent of maximum. 90° later the current around pole 11 will be a maximum, the current around pole 12 will be zero, and the current around poles 13 and 14 will be fifty per cent of maximum, etc. If the frequency of $f_1+\Delta$ is lower than $f_1$, the field will rotate in the other direction. That is, 90° after the current around pole 12 is a maximum, the current around pole 14 will be a maximum, and the current around pole 13 will be zero, etc. The condenser geared to the rotor is, of course, adjusted to make the correction in the frequency of $f_1+\Delta$ in the proper direction. The direction the motor will turn for a high frequency of one source with respect to the other may be determined with known frequencies if desired.

The rotor 15 of the motor, in a specific design, consists of a one-fourth inch thick soft iron member provided with 11 teeth, the width of the tooth being slightly less than half the tooth pitch. The rotor is mounted directly on the outer race 16 of a ball bearing 17. The inner race 18 of the bearing is fixed on a stationary shaft (not shown). A vertical hub (not shown) is connected to the upper side of the outer ball bearing race and carries a shaft containing a worm gear for driving the condenser. The stator structure of the motor consists of four poles 11, 12, 13 and 14, each pole face being provided with two polar projections each having a width slightly greater than that of an armature tooth. When the teeth on one polar projection (12, Fig. 1) are exactly in alignment with the teeth on the rotor, the teeth on the diametrically opposite polar projection (11) are completely out of alignment, while the teeth on the other two pole faces 13, 14 are approximately 50% in alignment.

Assume that the maximum current is flowing in the winding around pole 12 at any instant and that the field is rotating in the direction 12—14—11—13. At this instant there will be no current around pole 11 so this pole will have no effect on the motion of the rotor. The current around poles 13 and 14 will be 50% of maximum, but the effect of pole 13 will be a torque impulse in a clockwise direction, while the effect of pole 14 will be a counter-clockwise torque. These two effects will balance out. The net resultant torque of all the stator poles is therefore that due to pole 12 which therefore causes the rotor teeth to align with the polar projections of pole 12. 90° later the current around pole 14 will be a maximum, while the current around pole 13 will be zero, and the current around poles 11 and 12 will be 50% of maximum. Pole 14 will exert a maximum torque impulse, pole 31 will exert a zero torque, while poles 11 and 12 will exert a 50% impulse each in opposite directions which will balance out. The rotor will therefore now move one-quarter of a tooth pitch in a counter-clockwise direction so that the rotor teeth will align with pole 14. 90° later pole 11 will be a maximum, pole 12 will exert a zero torque, and poles 13 and 14 will balance out, etc. The result will be a counter-clockwise rotation of the rotor.

If the field is rotating in the opposite direction, that is, if the other of the two input frequencies is higher, 90° after pole 12 is a maximum, pole 13 will be a maximum, pole 14 will be zero, and poles 11 and 12 will balance out. 90° later pole 11 will be a maximum, pole 12 will be zero, and poles 13 and 14 will balance out, etc. The result will be a clockwise rotation of the rotor.

Figure 2:
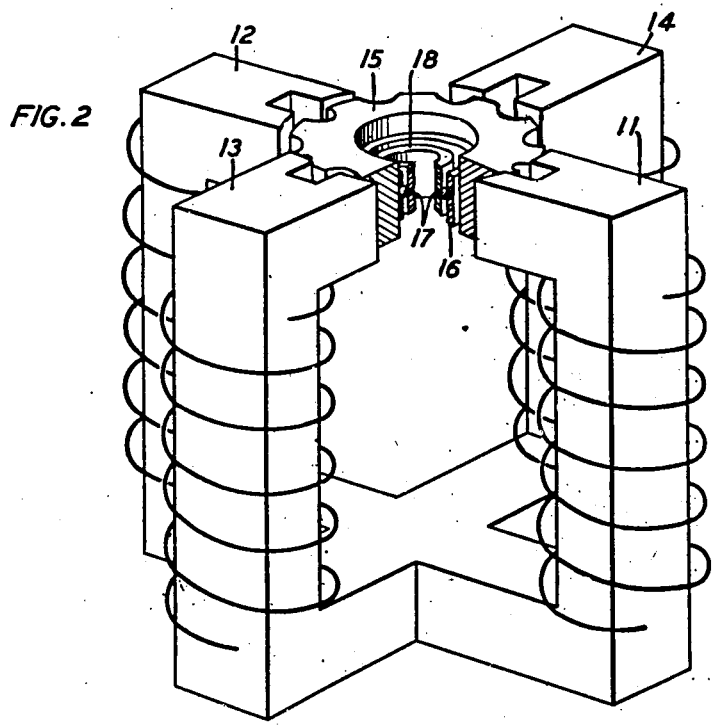
Fig. 2 is a schematic elevation of the motor partly in section.

The poles are connected at their bases so that they have a common magnetic return as shown in Fig. 2. The windings are arranged around poles 11 and 12 so that they are always polarized in one direction and the windings are arranged around poles 13 and 14 so that they are always polarized in the opposite direction, that is, poles 11 and 12 may always be north poles and poles 13 and 14 may always be south poles.

When the teeth on the rotor are in alignment with the teeth on pole 12 as shown in Fig. 1, there will be a maximum flux between the pole 12 and the rotor. As there is zero current around pole 11 at this instant, there will be no flux between pole 11 and the rotor. As the teeth on poles 13 and 14 are 50% in alignment with the rotor teeth at this instant, the flux from pole 12 will divide evenly between these two poles and return through the base of the yoke. The condition will be the same for maximum flux between any pole and the rotor. That is, the flux between the opposite pole and the rotor will be zero, and the teeth on the two poles at 90° will be 50% in alignment providing a path of equal reluctance for the return of the flux in every case. This arrangement causes the motor to operate more smoothly and efficiently.

The quarter tooth pitch displacement of successive stator poles with respect to the rotor teeth also causes the rotor to be rotated an amount equal to one tooth pitch for each cycle of current, and thus effectively provides an electrical reduction gear and requires a smaller force for operation of the motor.

In the foregoing explanation the action of the motor has been considered for the sake of simplicity at successive intervals of one-quarter of a cycle, which results in successive movements of one-quarter of a rotor tooth pitch. The operation of the motor is of course not limited to a minimum movement of one-quarter of a rotor tooth pitch, but if the stator phases are displaced a smaller amount, say one-eighth of a cycle, the rotor will move a corresponding amount.

The foregoing explanation has also been based on 100% modulation, i. e., that the plate current varied from the maximum value to zero. It is not essential that 100% modulation be provided, as the motor will operate in the same manner if the mean value of the D. C. plate current is raised so that a given value of the A. C. component may result in only 50% modulation. The maximum permissible limit of the polarizing D. C. component is a function of the saturation current of the pole winding, while the minimum limit, without loss of sensitivity is a D. C. component equal to the peak value of the A. C. component.

What is claimed is:

1. A self-starting synchronous motor comprising a stator having pole pieces and windings therefor, means for supplying a cyclic current to said windings, a rotor having a small moment of inertia and a cylindrical central aperture, said rotor having teeth arranged to align at a given instant with one pole piece only and successively with said pole pieces, and a ball bearing assembly comprising a fixed inner race positioned concentrically within said aperture and an outer race attached to said rotor.

2. A motor comprising a stator having a plurality of pole pieces and a rotor having teeth arranged so as to fully align at a given instant with one pole piece only and successively with said pole pieces, and means associated with said stator for oppositely polarizing adjacent pole pieces and for producing maximum polarization of one pole piece only at a given instant and of consecutive pole pieces successively.

3. A motor comprising a stator having a plurality of pole pieces each including a set of polar projections and a rotor having teeth arranged to be at a given instant in full alignment with a set of polar projections on one pole piece, in complete juxtaposition with the set on the oppositely positioned pole piece and in partial alignment with those on the remaining pole pieces, means comprising energized stator windings for oppositely polarizing adjacent pole pieces and for producing maximum polarization of consecutive pole pieces successively, said means being adapted to vary simultaneously and oppositely the polarization intensities of oppositely positioned pole pieces.

4. A polyphase motor comprising a stator having an even plurality of pole pieces each including a set of projections and a rotor having teeth arranged so as to fully align at a given instant with one set of projections only and successively with consecutive sets of projections upon rotor movements corresponding to a fraction of a tooth pitch equal to the reciprocal of the number of phases, means comprising energized stator windings for oppositely polarizing adjacent pole pieces, said means being adapted to vary simultaneously and oppositely the polarization intensities of oppositely positioned pole pieces and to vary similarly and successively the polarization intensities of consecutive pole pieces.

HUGH M. STOLLER.

CERTIFICATE OF CORRECTION.

Patent No. 1,959,449.  May 22, 1934.

HUGH M. STOLLER.

It is hereby certified that error appears in the above numbered patent requiring correction as follows: In the drawing, Figure 1 should appear as shown below instead of as in the patent -

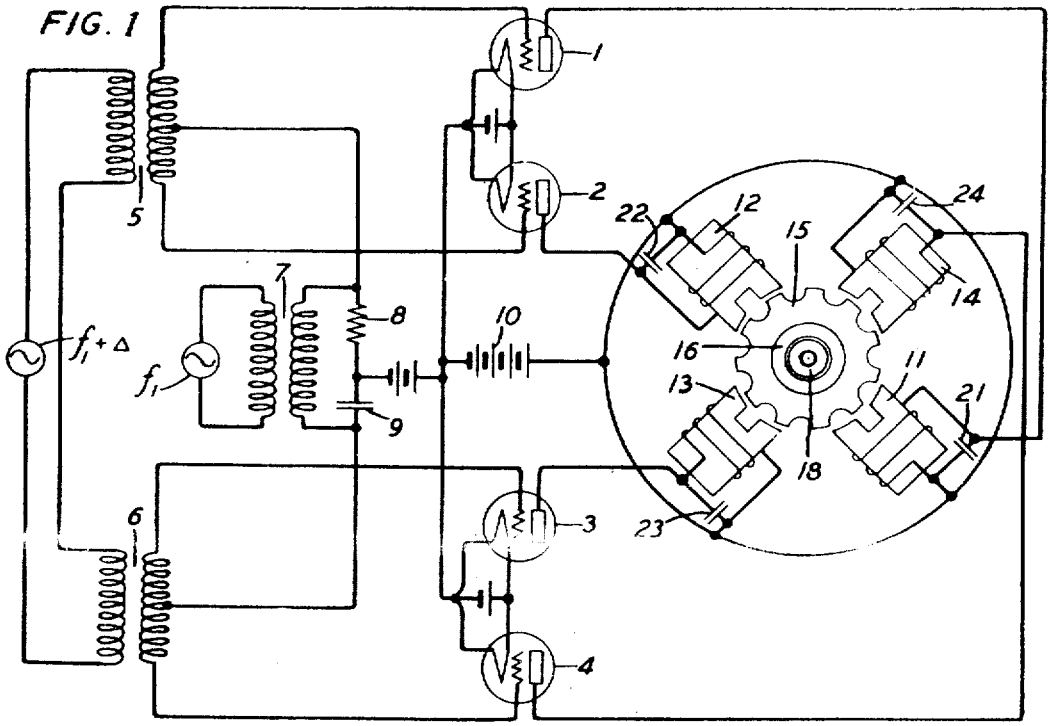

and that the said Letters Patent should be read with this correction therein that the same may conform to the record of the case in the Patent Office.

Signed and sealed this 28th day of March, A. D. 1944.

Leslie Frazer (Seal)  Acting Commissioner of Patents.